(12) United States Patent
Garimella et al.

(10) Patent No.: US 9,261,002 B2
(45) Date of Patent: Feb. 16, 2016

(54) FEED-BACK FOR CLOSED-LOOP SELECTIVE CATALYTIC REDUCTION CONTROL

(71) Applicant: Cummins Inc., Columbus, IN (US)

(72) Inventors: Phanindra V. Garimella, Bloomington, IN (US); Ming-Feng Hsieh, Nashville, IN (US)

(73) Assignee: Cummins Inc., Columbus, IN (US)

( * ) Notice: Subject to any disclaimer, the term of this patent is extended or adjusted under 35 U.S.C. 154(b) by 27 days.

(21) Appl. No.: 14/302,310

(22) Filed: Jun. 11, 2014

(65) Prior Publication Data

US 2015/0361845 A1 Dec. 17, 2015

(51) Int. Cl.
*F01N 3/20* (2006.01)
*F01N 11/00* (2006.01)
*F01N 9/00* (2006.01)

(52) U.S. Cl.
CPC *F01N 3/208* (2013.01); *F01N 9/00* (2013.01); *F01N 11/00* (2013.01); *F01N 11/002* (2013.01); *F01N 2560/026* (2013.01); *F01N 2560/06* (2013.01); *F01N 2560/14* (2013.01); *F01N2610/02* (2013.01); *F01N 2610/146* (2013.01); *F01N 2900/0404* (2013.01); *F01N 2900/0408* (2013.01); *F01N 2900/0411* (2013.01); *F01N 2900/0412* (2013.01); *F01N 2900/1402* (2013.01); *F01N 2900/1404* (2013.01); *F01N 2900/1602* (2013.01); *F01N 2900/1616* (2013.01); *F01N 2900/1621* (2013.01)

(58) Field of Classification Search
CPC . F01N 3/208; F01N 11/002; F01N 2560/026; F01N 2560/06; F01N 2560/14; F01N 2610/02; F01N 2610/146; F01N 2900/0404; F01N 2900/0408; F01N 2900/0411; F01N 2900/0412; F01N 2900/1402; F01N 2900/1404; F01N 2900/1602; F01N 2900/1616; F01N 2900/1621
USPC .................. 60/274, 276, 277, 286, 295, 301
See application file for complete search history.

(56) References Cited

U.S. PATENT DOCUMENTS 8,020,374 B2  9/2011  Walz et al.
8,061,126 B2  11/2011  Gady et al.
(Continued)

FOREIGN PATENT DOCUMENTS

WO     2014001804     1/2014

OTHER PUBLICATIONS

ISA/US International Searching Authority International Search Report and Written Opinion, PCT Application No. PCT/US15/35284, dated Sep. 2, 2015, 8 pgs.

*Primary Examiner* — Thomas Denion
*Assistant Examiner* — Jorge Leon, Jr.
(74) *Attorney, Agent, or Firm* — Taft Stettinius & Hollister LLP

(57) ABSTRACT

A system and method for using feed-back information, such as, for example, system-out $NO_x$ levels, to provide for closed-loop selective catalytic reduction control. A reference generation module may adjust an ideal SCR conversion value based on a quantity of reductant slippage from the engine system so as to provide an adjusted ideal SCR conversion efficiency value. The adjusted ideal SCR conversion efficiency value may then be used to generate a reductant to $NO_x$ ratio that corresponds to an ideal reductant dosing command. The ideal reductant dosing command may be further adjusted to account for low frequency variations, such as, low frequency variations in the SCR system, to generate an adjusted ideal reductant dosing command. The adjusted ideal reductant dosing command may be further adjusted to reflect high frequency variations in the SCR system, before a final reductant dosing command is generated for a reductant injector.

20 Claims, 3 Drawing Sheets

(56) References Cited

U.S. PATENT DOCUMENTS

| | | |
|---|---|---|
| 8,201,394 B2 | 6/2012 | Chi et al. |
| 8,387,368 B2 | 3/2013 | Parmentier et al. |
| 8,834,820 B1 * | 9/2014 | Mowers .................. F01N 3/208 422/105 |
| 2008/0245058 A1 | 10/2008 | Boddy et al. |
| 2009/0272102 A1 | 11/2009 | Ofoli et al. |
| 2010/0024390 A1 | 2/2010 | Wills et al. |
| 2010/0050614 A1 | 3/2010 | Parmentier et al. |
| 2010/0229531 A1 | 9/2010 | Chi et al. |
| 2011/0283678 A1 * | 11/2011 | Zanetti .................... F01N 3/208 60/274 |
| 2012/0137657 A1 | 6/2012 | Dahl et al. |
| 2015/0190749 A1 * | 7/2015 | Williams ................ F01N 3/208 422/83 |

* cited by examiner

FEED-BACK FOR CLOSED-LOOP SELECTIVE CATALYTIC REDUCTION CONTROL

BACKGROUND

Embodiments of the present invention generally relate to engine after-treatment control systems. More particularly, embodiments of the present invention relate to the use of feed-back information with engine after-treatment control systems to provide for closed-loop selective catalytic reduction control.

Selective catalytic reduction (SCR) systems typically are configured to provide one or more catalyst elements that, with the aid of a reductant, covert nitrogen oxides ($NO_x$) in exhaust gases into nitrogen ($N_2$) and water. The reductant, such as, for example, ammonia ($NH_3$), may be injected into the exhaust gas upstream of the SCR catalyst. Typically, engine after-treatment systems attempt to inject a sufficient quantity of reductant into the exhaust gas necessary for the conversion of a predetermined amount of the $NO_x$ in the exhaust gas so as to prevent $NO_x$ slippage without incurring reductant slippage.

Numerous variable parameters affect the determination of the quantity of reductant that is to be injected into exhaust gases. Further, at least some of these variables may change during operation of the engine, such as, for example, due to changes in engine operating or environmental conditions, or the performance of components within the engine system. Additionally, at least some of these changes may occur relatively rapidly and/or be relatively short in duration, thereby allowing for a relatively short time period for the detection of such changes and to respond accordingly. Conversely, other changes, such as, for example, catalyst aging, may be more gradual, thereby requiring both monitoring over relatively long periods of time and adaptation strategies that are different than strategies that address variations that are more transient in nature. Further, the inability to accurately, and timely, detect and/or predict such shorter and longer term changes or variations may hinder the ability of the after-treatment system to relatively effectively treat $NO_x$ in exhaust gases, and thereby may increase the occurrence of $NO_x$ slippage or reductant slippage.

BRIEF SUMMARY

An aspect of the present invention is a system for controlling the operation of an SCR system of an engine system. The system includes a reference generation module that is adapted to output an adjusted ideal SCR conversion efficiency value. According to certain embodiments, the adjusted ideal SCR conversion efficiency value may be an ideal SCR conversion efficiency value that is adjusted based on a quantity of reductant slippage from the engine system. The system may also include a feed-forward module that is adapted to determine a reductant to $NO_x$ ratio that is based, at least in part, on the adjusted ideal SCR conversion efficiency value and an SCR conversion efficiency model. Additionally, the feed-forward module is adapted to output an ideal reductant dosing command using the reductant to $NO_x$ ratio. The system may further include a feed-back module that is adapted to output a high frequency adaption value, the high frequency adaption value being indicative of the impact one or more high frequency variations in the engine system have on at least the adjusted ideal SCR conversion efficiency value. The system may also include an adaption module that is adapted to output a low frequency adaption value that is indicative of the impact one or more low frequency variations has/have on the ideal SCR conversion efficiency value.

Another aspect of the present invention is a method for closed-loop control of an SCR system of an engine system that has a controller. The method includes adjusting, by the controller, an ideal SCR conversion efficiency value based on a quantity of reductant slippage from the engine system to determine an adjusted ideal SCR conversion efficiency value. A reductant to $NO_x$ ratio is also determined that is based, at least in part, on the adjusted ideal SCR conversion efficiency value and an SCR conversion efficiency model. Additionally, an ideal reductant dosing command is determined using, at least in part, the determined reductant to $NO_x$ ratio. The method further includes determining a low frequency variation adaption value that is indicative of low frequency variations in the SCR system. Additionally, the ideal reductant dosing command is adjusted based on the low frequency variation adaption value to determine an adjusted dosing command. A high frequency variation adaption value is also determined that is indicative of high frequency variations in the SCR system, with the high frequency variations occurring over a shorter time span than the low frequency variations. The method further includes adjusting the adjusted dosing command based on the high frequency variation adaption value to determine a final dosing command. The final dosing command may be indicative of the quantity of reductant that is to be injected into an exhaust stream by a reductant injector.

Another aspect of the present invention is a method for adjusting a reductant dosing command based on a high frequency variation in an SCR system. The method includes detecting a temperature within the SCR system and establishing an SCR conversion efficiency reference value, the SCR conversion efficiency reference value being indicative of an SCR conversion efficiency level that is at least being attempted to be attained by the SCR system. Additionally, upper and lower SCR conversion efficiency bounds are established that are indicative of upper and lower limits, respectively, of an SCR conversion efficiency value. The method further includes establishing at least one upper mode boundary between the upper SCR conversion efficiency bound and the SCR conversion efficiency reference value and at least one lower mode boundary between the lower SCR conversion efficiency bound and the SCR conversion efficiency reference value. The combination of upper and lower SCR conversion efficiency bounds, upper and lower mode boundaries, and the SCR conversion efficiency reference may be used to establish controller modes that each provide different indications to a feed-back module of an amount of an adjustment to make to the reductant dosing command. The method also includes detecting, and issuing a command to adjust the reductant dosing command associated with, which of the controller modes an SCR system conversion efficiency of an engine system is occupying.

Other aspects of the present invention will become apparent by consideration of the detailed description and accompanying drawings.

Figure 1:
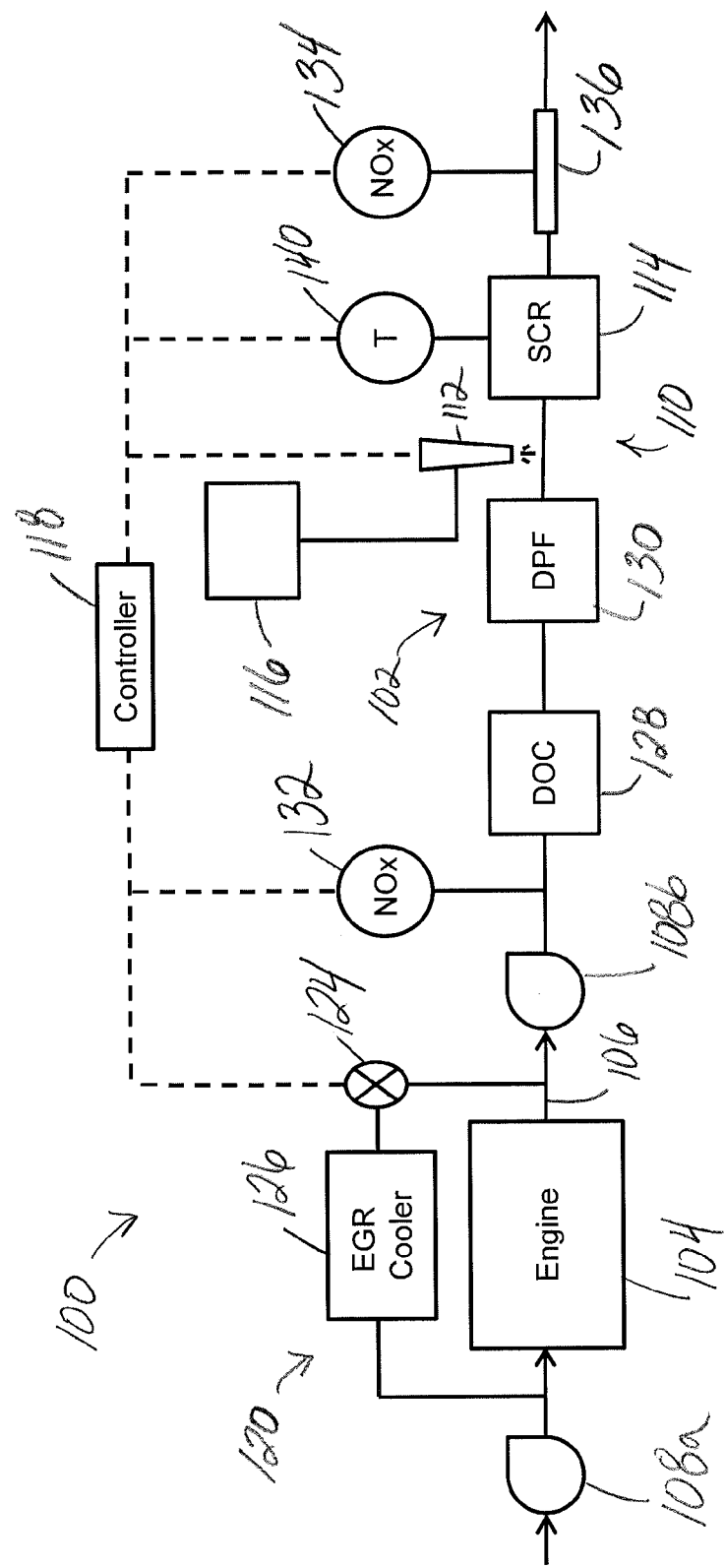
FIG. 1 illustrates a schematic block diagram of an engine system having an exhaust gas after-treatment system.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

FIG. 1 illustrates a schematic block diagram of an engine system 100 having an exhaust gas after-treatment system 102. The engine system 100 includes an engine 104, such as, for example, a combustion engine, including, but not limited to, a diesel, gasoline, natural gas, and/or combined fuel engine. Operation of the engine 104 generates an exhaust stream 106 that has an amount of $NO_x$ as a constituent therein. Optionally, according to certain embodiments, the engine system 100 includes a turbocharger having a compressor side 108a on an intake side of the engine 104, and a turbine side 108b on an exhaust side of the engine 104.

The after-treatment system 102 includes a selective catalyst reduction (SCR) system 110. According to certain embodiments, the SCR system 110 includes a reductant injector or doser 112 and an SCR catalyst component 114. The reductant injector 112 is in fluid communication with a reductant source 116, and is controllable by a controller 118. The reductant source 116 may contain a reductant such as, for example, ammonia ($NH_3$), urea, and/or a hydrocarbon, that is supplied for injection by the reductant injector 112 into the exhaust stream 106 at a position upstream of the SCR catalyst component 114. The controller 118 may be configured to both determine a ratio of reductant to $NO_x$ in the exhaust stream, such as, for example, an ammonia to $NO_x$ ratio (ANR), during operation of the engine, and to adjust the operation of the reductant injector 112 to achieve a target reductant to $NO_x$ ratio. Additionally, the SCR catalyst component 114 is configured to provide an SCR catalyst that at least assists in the reductant reacting with $NO_x$ in the exhaust gas to reduce the amount of $NO_x$ in the exhaust stream 106.

Optionally, the after-treatment system 102 may include additional after-treatment components, including, but not limited to, an exhaust gas recirculation (EGR) system 120, a diesel oxidation catalyst (DOC) 128, and/or a particulate filter, such as, for example, a diesel particulate filter (DPF) 130. For example, as shown in FIG. 1, according to certain embodiments, the after-treatment system 102 may include an EGR system 120 that has an exhaust flow path that delivers a portion of the exhaust stream 106 to an intake side of the engine 104, and which includes an EGR valve 124 and an EGR cooler 126.

According to certain embodiments, the after-treatment system 102 includes at least one engine-out $NO_x$ sensor 132 that is used in detecting a $NO_x$ level in the exhaust stream 106 upstream of the SCR system 110. In the illustrated embodiment, one or more engine-out $NO_x$ sensors 132 may be positioned upstream of the DOC 128, the particulate filter 130, and/or the reductant injector 112. Further, according to the illustrated embodiment, the engine-out $NO_x$ sensor 132 may provide a signal for the controller 118 that indicates, and/or is used in determining, a level of $NO_x$ in the exhaust gas at a location upstream of the reductant injector 112. Alternatively, the quantity of engine-out $NO_x$ may be modeled, calculated from an engine operation map, and/or measured from a location that is different than the location of the engine-out $NO_x$ sensors 132 shown in FIG. 1.

The after-treatment system 102 may also include at least one system-out $NO_x$ sensor 134 that is positioned downstream of the SCR catalyst component 114. The system-out $NO_x$ sensor 134 may be used in determining the quantity of $NO_x$ that is being released from the engine system 100, such as, for example, the amount of $NO_x$ that is being released from the engine system 100 via a tailpipe 136. Additionally, the engine-out and system-out $NO_x$ sensors 132, 134 employed by the after-treatment system 102 need not be of the same type or capability. Further, the engine system 100 may include additional $NO_x$ sensors positioned at other locations throughout the engine system 100 and/or the after-treatment system 102 that provide information that indicates, or otherwise is used to determine, $NO_x$ levels in the exhaust stream 106.

The after-treatment system 102 may also include at least one temperature sensor 140 that is in communication with the controller 118. According to certain embodiments, the temperature sensor 140 can be used to determine a temperature of the SCR catalyst component 114, and more specifically, the temperature of the SCR catalyst that is within the SCR catalyst component 114. According to certain embodiments, the temperature sensor 140 is positioned within the SCR catalyst component 114. Alternatively, the temperature sensor 140 is positioned upstream and/or downstream of the SCR catalyst component 114. Further, the temperature of the SCR catalyst component 114 may be determined in a variety of different manners, including, for example, at least by utilizing a weighted average of temperature sensors that are positioned upstream and downstream of the SCR catalyst component 114, or modeling and/or estimating the temperature of the SCR catalyst component 114 based upon other temperature measurements available in the engine system 100, and more specifically, within the after-treatment system 102.

Figure 2:
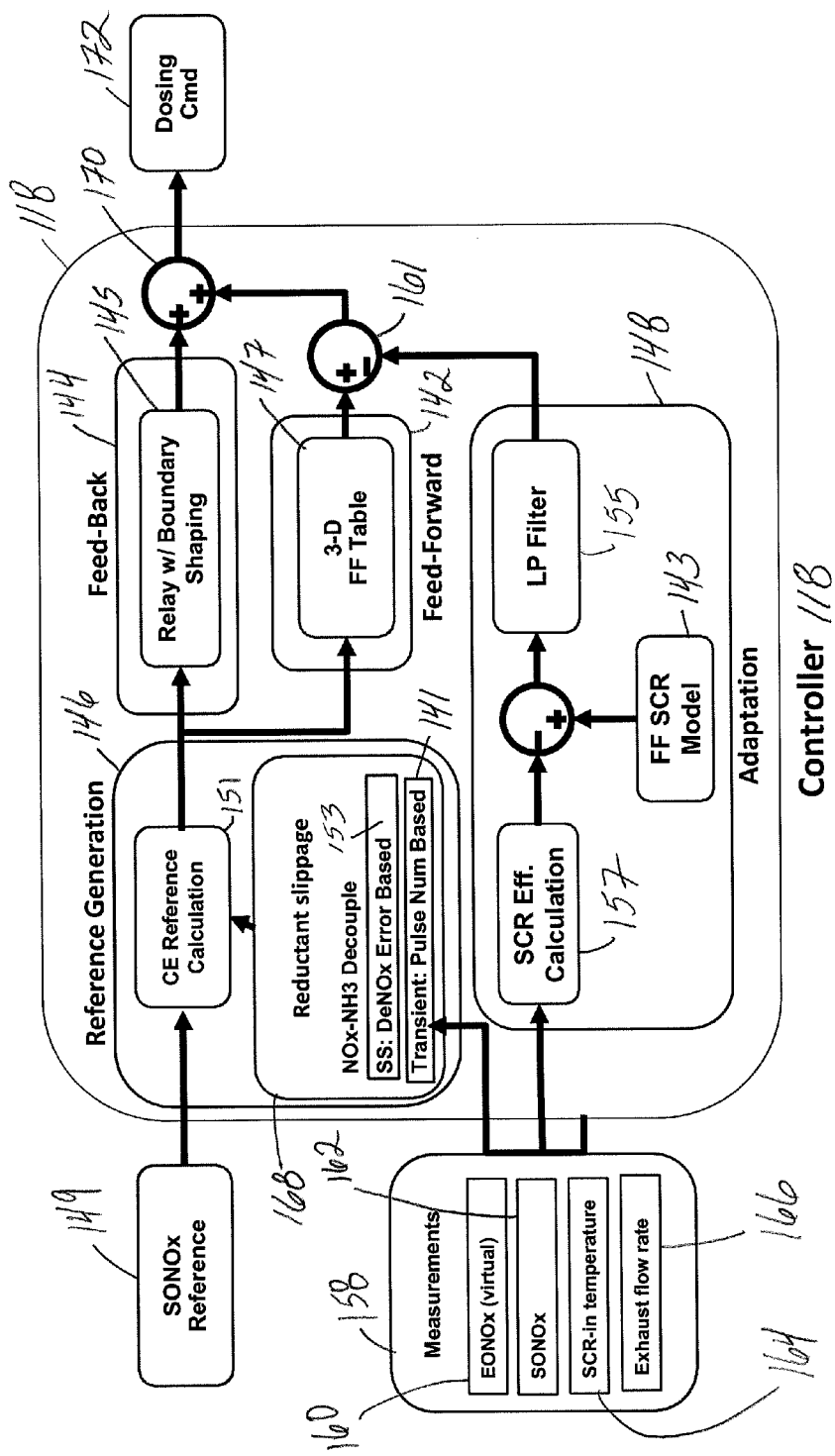
FIG. 2 illustrates a schematic diagram of a controller that functionally executes certain operations for controlling an after-treatment system.

FIG. 2 illustrates a schematic diagram of a controller 118 that functionally executes certain operations for controlling the after-treatment system 102. The controller 118 may include a number of modules structured to functionally execute the operations of the controller 118. For example, an exemplary controller 118 includes a feed-forward module 142, a feed-back module 144, a reference generation module 146, and an adaption module 148. In certain embodiments, the controller 118 forms a portion of a processing subsystem including one or more computing devices having memory, processing, and communication hardware. The controller 118 may be a single device or a distributed device, and the functions of the controller 118 may be performed by hardware or software.

The description herein including modules emphasizes the structural independence of the aspects of the controller 118, and illustrates one grouping of operations and responsibilities of the controller 118. Other groupings that execute similar overall operations are understood within the scope of the present application. Additionally, modules may be implemented in hardware and/or software on computer readable medium, and modules may be distributed across various hardware or software components.

The reference generation module 146 is configured to provide an adjusted ideal SCR conversion efficiency value to the feed-back module 144 and the feed-forward module 142. The adjusted ideal SCR conversion efficiency value may reflect an ideal or desired SCR conversion efficiency for the SCR system 102 as adjusted based on the occurrence of reductant slippage from the engine system 100, and more specifically, from the after-treatment system 102, whether measured and/or virtual. More specifically, according to the illustrated embodiment, the adjusted ideal SCR conversion efficiency value may be generated by the reference generation module 146 by adjusting an ideal system-out NOx reference value ("SONOx Reference") 149, such as, for example, the system-out NOx value under ideal conditions, by a conversion efficiency reference calculation ("CE Reference Calculation") 151. According to the illustrated embodiment, the conversion efficiency reference calculation 151 may be a calculated SCR conversion efficiency that considers the existence and/or amount of reductant slippage from the engine system 100, as provided by a reductant slippage module 168 of the reference generation module 146.

The reductant slippage module 168 may utilize a variety of information to determine the existence of reductant slippage, as well as the amount of reductant slippage. Moreover, in the illustrated embodiment, the reductant slippage module 168 may utilize one or more measured, sensed, predicted, or estimated measurements 158 to determine at least the presence of reductant slippage during both steady-state and transient conditions. Such measurements 158 may include, for example, a virtual or sensed engine-out $NO_x$ concentration 160 as detected by the engine-out $NO_x$ sensor 132, and a system-out $NO_x$ concentration downstream of the SCR catalyst component 114, such as, for example, a system-out NOx concentration in the tailpipe 136 as detected by a system-out $NO_x$ sensor 134. The measurements 158 may also include an SCR temperature 164, such as, for example, as temperature as detected by the temperature sensor 140, and an exhaust flow rate 166. According to certain embodiments, during steady state conditions, such measurements 158 may be used by a $NO_x$-reductant decouple algorithm to determine an SCR conversion efficiency error ("DeNOx Error Based") 153, such as, for example, the difference between the ideal system-out NOx reference value 149 and an actual SCR conversion efficiency, which may be based on an evaluation or comparison of the $NO_x$ detected by the engine-out and system-out $NO_x$ detectors 132, 134, respectively. According to certain embodiments, the actual SCR conversion efficiency may be determined by the reductant slippage module 168, or may be provided by the SCR conversion efficiency that is calculated or otherwise used by the adaption module 148, as discussed below. The determined SCR efficiency error 153 may then be used to determine presence and associated quantity of reductant slippage from the engine system 100.

According to the illustrated embodiment, during transient events, the reductant slippage module 168 may use another $NO_x$-reductant decoupling algorithm to evaluate possible changes in the sensitivity of at least the system-out $NO_x$ sensor due to the presence of reductant in the exhaust stream 106 to determine and/or quantify the occurrence of reductant slippage. For example, the occurrence of a transient event, such as a sudden change in engine speed, may cause at least a temporary change(s) in the amount of $NO_x$ released from the engine 104, and thus the amount of $NO_x$ detected by the $NO_x$ engine-out sensor 132. During and/or upon completion of the transient event, the amount of $NO_x$ released from the engine 104 may again change. Such changes, such as, for example, one or more rises, peaks, and decreases, in $NO_x$ levels, referred to herein as pulses, may be detected upstream of at least the reductant injector 112 by the engine-out NOx sensor 132. However, the presence of reductant in exhaust gas stream, and particularly reductant associated with reductant slippage due to a change in conditions as a result of a transient event, may adversely impact the sensitivity of $NO_x$ sensors downstream of the SCR catalyst component 114. Therefore, when reductant is present in the exhaust stream 106, $NO_x$ sensors, such as, for example, the system-out $NO_x$ sensor 134, may not accurately detect such pulses and/or timely detect changes in the pulses. Therefore, in the present example, the reductant slippage module 168 may be adapted to evaluate, during transient events, differences in the number and/or characteristics of pulses detected, and/or not detected, by the $NO_x$ sensors upstream and downstream of the reductant injector 112, including, for example, the engine-out and system-out $NO_x$ sensors 132, 134. Such detected differences in the pulses may then be used by a pulse number based algorithm 141 to indicate, and/or quantify, the presence of reductant slippage. Further, such reductant slippage may be used by the reductant slippage module 168 to determine an actual SCR conversion efficiency.

According to certain embodiments, using the adjusted ideal SCR conversion efficiency value provided by the reference generation module 146 and an SCR conversion efficiency model, the feed-forward module 142 may generate a feed-forward reductant to $NO_x$ ratio, and more specifically, an ideal dosing command based on the generated feed-forward reductant to $NO_x$ ratio. According to certain embodiments, the feed-forward reductant to $NO_x$ ratio may be, at least in part, based on a variety of different look-up tables, such as, for example, a three dimensional look-up table 147, and/or models that utilize one or more measured, sensed, predicted, or estimated values or parameters of the after-treatment system 112. In the illustrated embodiment, the feed-forward reductant to $NO_x$ ratio may consider a target SCR efficiency value of the SCR system 110, such as, for example a target of the level, quantity, or percentage of $NO_x$ conversion using a SCR efficiency conversion model from the feed-forward SCR model 143 of the adaption module 148, as discussed below. Additionally, according to certain embodiments, the feed-forward reductant to $NO_x$ ratio may be based, at least in part, on an exhaust flow rate and an SCR catalyst temperature.

Depending on at least certain operating conditions, the ideal dosing command(s) determined by the feed-forward module 142 may be adjusted by an adaption value provided by the adaption module 148. Such adjustments may improve the accuracy of the ideal dosing command(s) based on actual operating conditions of the engine system 100 and/or the after-treatment system 102, such as, for example, temperatures. According to the illustrated embodiment, the adaption module 148 may include a feed-forward SCR model 143 and a low pass filter 155. Additionally, according to certain embodiments, the adaption module 148 may be configured to determine a measured SCR conversion efficiency value 157 and/or utilize the measured SCR conversion efficiency value used by the reductant slippage module 168 in connection with determining the existence and/or amount of reductant slippage during steady state conditions, as previously discussed. For example, according to certain embodiments, the measured SCR conversion efficiency value 157 may be determined using one or more measurements 158 that are provided to the adaption module 148, as shown in FIG. 2. More specifically, according to certain embodiments, a measured SCR conversion efficiency value 157 may be based on an evaluation or comparison of the engine-out and system-out NOx levels, as measured by the corresponding engine-out and system-out $NO_x$ sensors 132, 134.

The feed-forward SCR model 143 may be adapted to determine a model SCR conversion efficiency value that indicates the effectiveness of the SCR system 110 and/or of the SCR catalyst component 114 in removing $NO_x$ from the exhaust stream 106. According to certain embodiments, the model SCR conversion efficiency value, as determined by the feed-forward SCR model 143, may be, at least in part, based on a variety of different look-up tables and/or models that utilize one or more measured, sensed, predicted, or estimated values or parameters of the after-treatment system 102. For example, in the illustrated embodiment, the model SCR conversion efficiency value may be based at least in part on an exhaust flow rate, such as, for example, a volumetric flow rate of the exhaust stream 106. The exhaust flow rate may be derived in a number of different manners, including for example, using an intake air flow mass of the engine 104 as measured by an air flow sensor and a volume of the SCR catalyst. Additionally, the model SCR conversion efficiency value may also be based, at least in part, on an SCR catalyst temperature, such as, for example, an SCR catalyst temperature as detected by use of a temperature sensor 140. The model SCR conversion efficiency value may also consider a reductant to $NO_x$ ratio, such as, for example, an ammonia to $NO_x$ ratio (ANR). Further, according to certain embodiments, the model SCR conversion efficiency value may also be based on the $NO_x$ level in the exhaust stream 106 upstream of the SCR system 110, such as, for example, the engine-out $NO_x$ level as detected through the use of an engine-out $NO_x$ sensor 132.

The adaption module 148 may be adapted to evaluate or compare the measured SCR conversion efficiency value 157 with the model SCR conversion efficiency value from the feed-forward SCR model 143. For example, according to the illustrated embodiment, the measured SCR conversion efficiency value 157 and the model SCR conversion efficiency value may be compared using an adaption comparator 159 to derive an unfiltered low frequency adaption value. According to the illustrated embodiment, the unfiltered low frequency adaption value includes an indication of the differences, if any, between virtual and measured SCR conversion efficiencies, among other information.

The unfiltered low frequency adaption value may pass through a low pass filter 155. The low pass filter 155 is configured to remove noise associated with high frequency variations in characteristics of the engine system 100 and/or after-treatment system 102 from the unfiltered low frequency adaption value, and thereby provide a filtered low frequency adaption value. Moreover, low frequency variations in the SCR system 110 that may provide an indication of the conversion efficiency of the SCR system 110 and/or changes in the conversion efficiency of the SCR system 110, such as, for example, catalyst degradation, may generally occur during relatively longer time periods. The low pass filter 155 may therefore remove from the unfiltered low frequency adaption value information pertaining to high frequency variations in the engine system 100 and/or the after-treatment system 102 that are not used to determine differences between measured and model SCR conversion efficiency, including, for example, measured or virtual characteristics of the engine system 100 that cover relatively short periods or durations of time. For example, in the illustrated embodiment, the low pass filter 155 may remove information relating to high frequency variations in the characteristics of the after-treatment system 102, such as measurements of engine-out $NO_x$ levels that are repeatedly taken at over the course of few seconds or minutes, so that the low frequency adaption value utilizes information that reflects engine-out $NO_x$ levels over relatively longer time periods, such as, for example, hours and days, among other time periods. However, the time duration considered in determining whether the variation is a low frequency variation or a high frequency variation may vary based on a variety of different considerations, including, for example, operating conditions for the engine system 100 and/or the type of variation.

As previously discussed, in the illustrated embodiment, the ideal dosing command outputted by the feed-forward module 142 utilizes the feed-forward SCR model 143 of the adaption module 148. However, the feed-forward SCR model 143 may include high frequency noise that may adversely impact the accuracy of the resulting ideal dosing command. Accordingly, in at least an attempt to improve the accuracy of the ideal dosing command that is outputted from the feed-back module 142, the ideal dosing command may be adjusted using the filtered low frequency adaption value. According to certain embodiments, such adjustment of the ideal dosing command may reflect the impact low frequency variations may have in the after-treatment system 102, and/or compensate for the impact high frequency variations may have had in determining the ideal dosing command. Thus, by applying the low frequency variation adaption value to the ideal dosing command, the resulting adjusted dosing command may more accurately reflect actual conditions of the engine system 100, including, for example, characteristics or conditions of the SCR catalyst component 114, such as, for example, characteristics, if any, related to catalyst degradation.

In the illustrated embodiment, a feed-forward comparator 161 receives the filtered low frequency adaption value from the adaptation module 148 and the ideal dosing command from the feed-forward module 142 and outputs the adjusted dosing command. Additionally, the filtered low frequency adaption value provided to the feed-forward comparator 161 may be a single value or multiple values. For example, according to certain embodiments, the filtered low frequency adaption value may include multiple values that are based on different operating conditions, such as, for example, different temperature zones. Using the data provided by the filtered low frequency adaption value, and the ideal dosing command, the feed-forward comparator 161 may increase or decrease the amount of reductant that the ideal dosing command would have injected into the exhaust stream 106. However, in certain situations, based on the data in the filtered low frequency adaption value, the feed-forward comparator 161 may not adjust the ideal dosing command, in which case the adjusted dosing command outputted from the feed-forward comparator 161 may be the same as the ideal dosing command.

The feed-back module 144 is adapted to determine one or more high frequency adaptation values that account for high frequency variations in the engine system 100 that may impact the conversion efficiency of the SCR catalyst component 114. For example, high frequency variations that occur during operation of the engine system 100, such as, for example, changes in the temperature of the SCR catalyst component, may cause fluctuations in the conversion efficiency of the SCR catalyst component 114. With such fluctuations, SCR conversion efficiencies may be above and below a desired, or reference, SCR efficiency value. Such changes in the temperature of the SCR catalyst component may also alter the amount of reductant stored by the SCR catalyst component 114. Moreover, as the temperature of the SCR catalyst component 114 increases, the amount of reductant stored by the SCR catalyst component 114 may decrease, which may increase the likelihood of reductant slip.

In an attempt to address the impact high frequency variations may have on SCR conversion efficiency, the feed-back module 144 may include a relay controller 145 that uses a temperature based algorithm to control changes in SCR efficiency. The temperature based algorithm may reference an upper SCR conversion efficiency bound or limit 150 and an lower SCR conversion efficiency bound or limit 152. The temperature based algorithm may also reference a SCR conversion efficiency reference value 154 that is within the upper and lower SCR conversion efficiency bounds 150, 152, and which may correspond to a target SCR conversion efficiency level for the SCR system 110.

Figure 3:
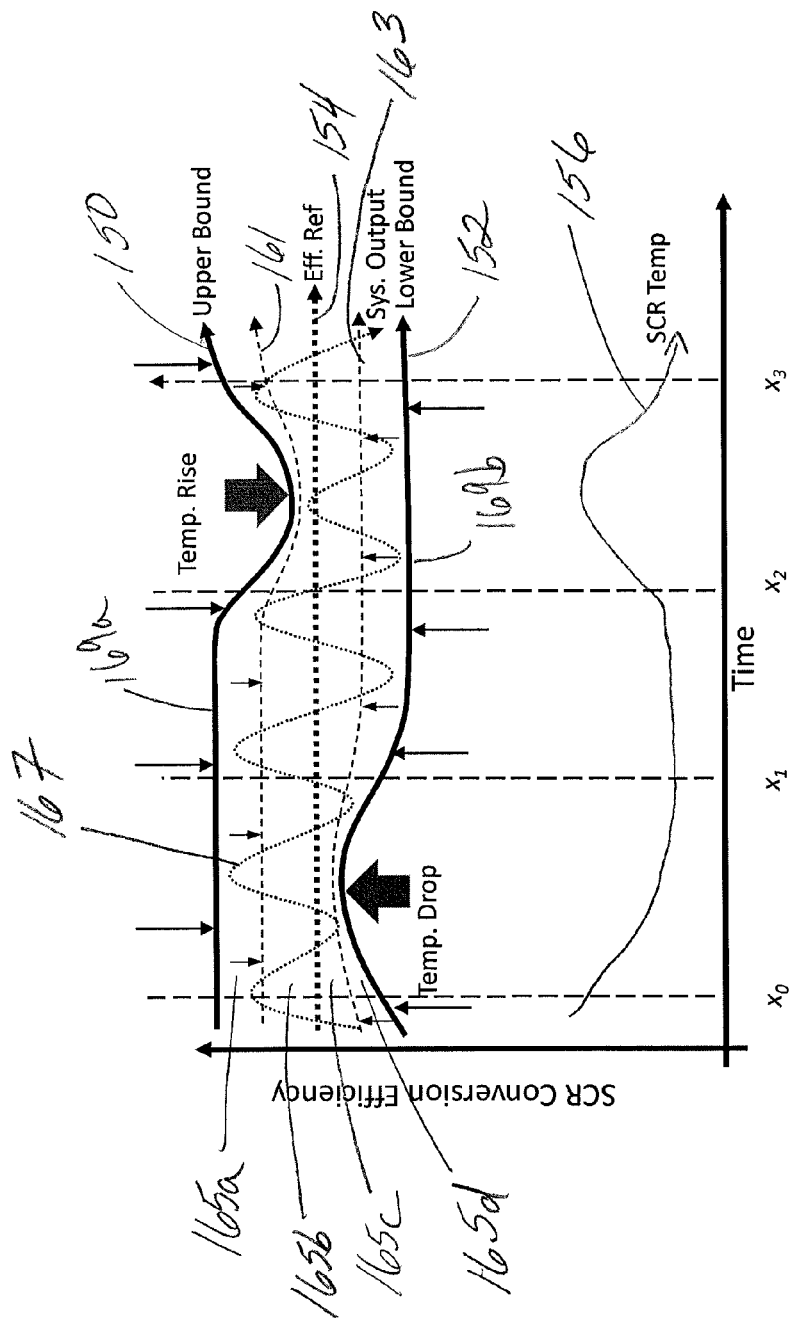
FIG. 3 is a graphical illustration of boundary shaping using a temperature based relay controller of a feed-back controller to control SCR conversion efficiency.

In the illustrated embodiment, the temperature based algorithm may also reference one or more mode boundaries that are used to establish one or more controller modes. The controller modes may provide an indication of the type of adjustment, if any, that may be made in the dosing command to account for high frequency variations in the engine system 100 and/or the after-treatment system 102. For example, referencing FIG. 3, in the illustrated embodiment the temperature based algorithm may utilize two mode boundaries 161, 163 that are used to provide, in connection with the upper and lower SCR conversion efficiency bounds 150, 152 and the SCR conversion efficiency reference value 154, four controller modes 165a-d. More specifically, as shown by FIG. 3, upper and lower mode boundaries 161, 163 may be positioned between the SCR conversion efficiency reference value 154 and the upper and lower SCR conversion efficiency bounds 150, 152, respectively. The area between the upper SCR conversion efficiency bound 150 and the upper mode boundary 161 may provide a first mode 165a, while the area between the upper mode boundary 161 and the SCR conversion efficiency reference value 154 may provide a second mode 165b. Similarly, the area between the SCR conversion efficiency reference value 154 and the lower mode boundary 163 may provide a third mode 165c, while the area between the lower mode boundary 163 and the lower SCR conversion efficiency bound 152 may provide a fourth mode 165d. While, for at least purposes of illustration, FIG. 3 demonstrates two mode boundaries 161, 163 and four associated controller modes 165a-d, the temperature based algorithm may be configured to include additional mode boundaries and associated controller modes, which may allow for more precise accuracy in adjustments to dosing command based on high frequency variations.

Referencing FIG. 3, the relay controller 145 may adjust the upper and lower bounds 150, 152 based on changes in the SCR catalyst temperature 156. For example, during time period $x_0$ to $x_1$, as the SCR catalyst temperature 156 decreases, the maximum reductant storage capacity of the SCR catalyst component 114 may also increase, thereby potentially reducing the possibility for reductant slippage. Accordingly, during the time period during which the SCR catalyst temperature decreases, the relay controller 145 may increase the lower SCR conversion efficiency bound 152 and the lower mode boundary 163 so that the lower mode boundary 163 and the lower SCR conversion efficiency bound 152 are closer to the SCR conversion efficiency reference value 154. As shown, such alterations of the lower SCR conversion efficiency bound 152 and the lower mode boundary 163 may reduce the size of the corresponding third and fourth modes 165c, 165d. Accordingly, the feed-back controller 144 may output high frequency adaption values that seek to maintain the actual or virtual SCR system conversion efficiency 167 of the SCR catalyst component 114 at or above the level of the SCR system conversion efficiency 167. For example, according to certain embodiments, during such conditions the high frequency adaption value may seek to increase the reductant level of the dosing command while maintaining the SCR system conversion efficiency 167 at least within the upper and adjusted lower SCR conversion efficiency bounds 150, 152.

As the SCR catalyst temperature 156 stabilizes during time period $x_1$ to $x_2$, and following a period in which the reductant level was to be increased, the relay controller 145 may reduce the lower SCR conversion efficiency bound 152 and the lower mode boundary 163. Such reductions may seek to prevent an over-supply of reductant to the SCR catalyst component 114 so as to at least attempt to prevent reductant slippage. In the illustrated embodiment, with the SCR catalyst temperature 156 generally stabilized during a portion of the $x_1$ to $x_2$ time period, the upper and lower SCR conversion efficiency bounds 150, 152 may be set so that the SCR efficiency of the system efficiency 167 is generally maintained in the second and third controller modes 165b, 165c. Accordingly, while the SCR catalyst temperature 156 is generally stable, the relay controller 145 may attempt to maintain a balance in the SCR system conversion efficiency 167 relative to the SCR conversion efficiency reference value 154 so that the overall conversion efficiency remains at around the SCR conversion efficiency reference value 154 without increasing the likelihood for reductant slippage. Accordingly, the high frequency adaption values between at least a portion of the $x_1$ to $x_2$ time period may switch from increasing to decreasing the amount of reductant that dosing command to obtain a balance in the reductant that is injected into the exhaust stream, and thereby attempt to attain a conversion efficiency that is generally around the SCR conversion efficiency reference value 154.

During time period $x_2$ to $x_3$, the SCR catalyst temperature 156 is shown as increasing, which may decrease the reductant storage capacity of the SCR catalyst component 114, while also increasing the propensity for reductant slippage. Accordingly, to at least attempt to avoid such slippage, the relay controller 145 may decrease both the upper SCR conversion efficiency bound 150 and the upper mode boundary 161 to levels that approach the SCR conversion efficiency reference value 154. The relay controller 145 may therefore seek to adjust, such as reduce the level of reductant being injected into the exhaust stream so that the SCR system conversion efficiency 167 may generally be maintained between the lower SCR conversion efficiency bound 152 and the SCR conversion efficiency reference value 154, thereby reducing the likelihood of reductant slippage. Further, as shown in FIG. 3, as the time period approaches $x_3$, and the SCR catalyst temperature 156 begins to decrease, the relay controller 145 may increase both the upper SCR conversion efficiency bound 150 and the upper mode boundary 161 to levels that approach the levels that were attained when the temperature stabilized during the $x_1$ to $x_2$ time period.

According to the illustrated embodiment, the high frequency adaption values provided by the feed-back module 144 and the adjusted dosing command from the feed-forward comparator 161 may be provided to a feed-back comparator 170. The feed-back comparator 170 may then determine, based on the high frequency adaption values, whether, or not, to adjust the adjusted dosing command, such as, for example, by increasing, decreasing, or leaving unchanged the amount of reductant that is to be injected into the exhaust stream 106. The feed-back comparator 170 will then output a final dosing command 172 that may be used in the operation of the reductant injector 112, and more specifically, that may indicate a quantity of reductant that is to be injected into the exhaust stream 106 by the reductant injector 112 to attain effective SCR conversion efficiency under current operating conditions while at least attempting to prevent reductant slippage.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system for controlling the operation of an SCR system of an engine system, the system comprising:
an electronic controller configured to:
output an adjusted target SCR conversion efficiency value, the adjusted target SCR conversion efficiency value being a target SCR conversion efficiency value that is adjusted based on a quantity of reductant slippage from the engine system;
determine a reductant to $NO_x$ ratio that is based, at least in part, on the adjusted target SCR conversion efficiency value and an SCR conversion efficiency model, and further adapted to output a target reductant dosing command using the reductant to $NO_x$ ratio;
output a first frequency adaption value, the first frequency adaption value indicative of an impact one or more first frequency variations in the engine system have on at least the adjusted target SCR conversion efficiency value; and
output a second frequency adaption value that is indicative of an impact one or more second frequency variations has on the target SCR conversion efficiency value, the one or more first frequency variations having a higher frequency than the one or more second frequency variations.

2. The system of claim 1, further including one or more $NO_x$ sensors adapted for the detection of the quantity of reductant slippage from the engine system, the electronic controller being further configured to generate the target SCR conversion efficiency value based at least in part on the quantity of reductant slippage from the engine system detected through use of the one or more $NO_x$ sensors.

3. The system of claim 2, wherein at least one of the one or more $NO_x$ sensors is positioned in a tailpipe of the engine system.

4. The system of claim 3, wherein the electronic controller includes a relay controller adapted to provide the first frequency adaption value based on changes in a temperature in the SCR system.

5. The system of claim 4, wherein the second frequency adaption value provides an indication of a degradation status of a SCR catalyst of the SCR system.

6. The system of claim 1, wherein the electronic controller is further configured to detect the quantity of reductant slippage using a $NO_x$-reductant decoupling algorithm during transient conditions, the NOx-reductant decoupling algorithm adapted to utilize differences in pulse detection between at least a first $NO_x$ sensor and a second $NO_x$ sensor, the first $NO_x$ sensor being positioned upstream of a SCR catalyst component, the second $NO_x$ sensor being positioned downstream of the SCR catalyst component.

7. The system of claim 1, wherein the electronic controller is further configured to:
based on the second frequency adaption value provide an adjusted dosing command; and
adjust the adjusted dosing command using the first frequency adaption value to output a final dosing command.

8. A method for closed-loop control of an SCR system of an engine system, the engine system having a controller, the method comprising:
adjusting, by the controller, a target SCR conversion efficiency value based on a quantity of reductant slippage from the engine system to determine an adjusted target SCR conversion efficiency value;
determining a reductant to $NO_x$ ratio that is based, at least in part, on the adjusted target SCR conversion efficiency value and an SCR conversion efficiency model;
determining a target reductant dosing command using, at least in part, the determined reductant to $NO_x$ ratio;
determining a second frequency variation adaption value, the second frequency variation adaption value indicative of second frequency variations in the SCR system;
adjusting the target reductant dosing command based on the second frequency variation adaption value to determine an adjusted dosing command;
determining a first frequency variation adaption value, the first frequency variation adaption value indicative of first frequency variations in the SCR system, the first frequency variations occurring over a shorter time span than the second frequency variations; and
adjusting the adjusted dosing command based on the first frequency variation adaption value to determine a final dosing command, the final dosing command indicative of the quantity of reductant that is to be injected into an exhaust stream by a reductant injector.

9. The method of claim 8, further including the steps of filtering, by a low pass filter, first frequency variations from an unfiltered adaption value, and outputting, from the low pass filter, the second frequency adaption variation value.

10. The method of claim 9, further including the steps of:
determining an $NO_x$ level upstream of the SCR system;
determining an $NO_x$ level downstream of the SCR system;
determining a measured SCR conversion efficiency value using an the determined $NO_x$ levels from upstream and downstream of the SCR system;
determining a model SCR conversion efficiency value; and
adjusting the determined model SCR conversion efficiency value using at least the measured SCR conversion efficiency value to generate the unfiltered adaption value.

11. The method of claim 10, wherein the step of determining an $NO_x$ level downstream of the SCR system includes detecting a $NO_x$ level in a tailpipe of the engine system using a $NO_x$ sensor.

12. The method of claim 9, further including the steps of:
detecting, using an $NO_x$ sensor positioned upstream of the SCR system and during transient events, one or more pulses in an $NO_x$ level in the exhaust stream; and
determining the quantity of reductant slippage based on differences between the one or more pulses detected using the $NO_x$ sensor and the detection, if any, of the one or more pulses using an $NO_x$ sensor positioned downstream of the SCR system.

13. The method of claim 12, further including the step of determining, during steady state conditions, a difference between the target SCR conversion efficiency value and the measured SCR conversion efficiency value to derive the quantity of reductant slippage.

14. The method of claim 9, wherein the step of determining the first frequency variation adaption value further includes determining an adjusted reductant level based on changes in a temperature of an SCR catalyst component of the SCR system.

15. The method of claim 14, wherein the second frequency variation adaption value provides an indication of a degradation status of a SCR catalyst of the SCR system.

16. A method for adjusting a reductant dosing command based on a frequency variation in an SCR system, the method comprising:

detecting a temperature within the SCR system;

establishing an SCR conversion efficiency reference value, the SCR conversion efficiency reference value indicative of an SCR conversion efficiency level that is at least being attempted to be attained by the SCR system;

establishing an upper SCR conversion efficiency bound indicative of an upper limit of an SCR conversion efficiency value;

establishing a lower SCR conversion efficiency bound indicative of lower limit of an SCR conversion efficiency value;

establishing at least one upper mode boundary between the upper SCR conversion efficiency bound and the SCR conversion efficiency reference value and at least one lower mode boundary between the lower SCR conversion efficiency bound and the SCR conversion efficiency reference value;

establishing at least a first controller mode between the at least one upper mode boundary and the upper SCR conversion efficiency bound, and at least a second controller mode between the at least one upper mode boundary and the SCR conversion efficiency reference value;

establishing at least a third controller mode between the at least one lower mode boundary and the SCR conversion efficiency reference value, and at least a fourth controller mode between the at least one lower mode boundary and the lower SCR conversion efficiency bound, the first, second, third, and fourth controller modes each providing a different indication of an amount to adjust the reductant dosing command; and detecting which of the first, second, third, and fourth controller modes an SCR system conversion efficiency of an engine system is occupying; and issuing a command to adjust the reductant dosing command corresponding to which of the first, second, third, and fourth controller modes the SCR system conversion efficiency is occupying.

17. The method of claim 16, further including the step of decreasing the at least one upper mode boundary and the upper SCR conversion efficiency bound in response to detecting an increase in the temperature within the SCR system.

18. The method of claim 16, further including the step of increasing the at least one lower mode boundary and the lower SCR conversion efficiency bound in response to detecting a decrease in the temperature within the SCR system.

19. The method of claim 18, wherein the detected temperature within the SCR system is a temperature of an exhaust stream.

20. The method of claim 18, wherein the detected temperature within the SCR system is a temperature of an SCR catalyst.

* * * * *